United States Patent [19]

Winsel et al.

[11] 4,148,978

[45] Apr. 10, 1979

[54] POSITIVE ELECTRODE FOR STORAGE BATTERY

[75] Inventors: August Winsel, Kelkheim; Ernst Voss, Liederbach; Welf Dennstedt; Waldemar Borger, both of Kelkheim, all of Fed. Rep. of Germany

[73] Assignee: Varta Batterie Aktiengesellschaft, Leineufer, Fed. Rep. of Germany

[21] Appl. No.: 854,275

[22] Filed: Nov. 23, 1977

[30] Foreign Application Priority Data

Dec. 14, 1976 [DE] Fed. Rep. of Germany ....... 2656506
Jul. 7, 1977 [DE] Fed. Rep. of Germany ....... 2715628

[51] Int. Cl.² .................................................. H01M 4/14
[52] U.S. Cl. ..................................... 429/217; 429/225; 429/245
[58] Field of Search ............... 429/225, 226, 228, 218, 429/212, 215, 217, 245, 234

[56] References Cited

U.S. PATENT DOCUMENTS

| | | | |
|---|---|---|---|
| 3,480,478 | 11/1969 | Sohn et al. | 429/217 |
| 3,723,182 | 3/1973 | Venuto | 429/228 |
| 3,751,301 | 8/1973 | Kilduff | 429/217 |
| 3,770,507 | 11/1973 | Weissman et al. | 429/225 X |
| 4,048,406 | 9/1977 | Sandera et al. | 429/217 X |

FOREIGN PATENT DOCUMENTS

1329974 9/1973 United Kingdom.

*Primary Examiner*—Anthony Skapars
*Attorney, Agent, or Firm*—Weiser, Stapler & Spivak

[57] ABSTRACT

The active mass is supported by an antimony free or antimony poor grid having embedded therein antimony-containing storage bodies from which the antimony is released in controlled manner during the life span of the electrode.

13 Claims, No Drawings

POSITIVE ELECTRODE FOR STORAGE BATTERY

This invention relates to a positive electrode for lead storage batteries having an electrode support frame of an antimony free or antimony poor lead alloy which contains antimony within the electrochemically active mass.

In lead storage batteries it is common practice to utilize antimony containing lead alloys both for positive and for negative grids or as structural elements providing further current conduction. Their antimony content goes up to about 9% and this antimony additive to the lead alloys has a considerable number of desirable effects. For example the casting capability of the alloy is improved and a hardness is achieved which facilitates the further treatment of the electrodes. Especially, however, the capacity characteristic of the positive electrode, particularly in cyclical utilization over many charge and discharge cycles, is improved and as a result the life of the electrode is enhanced.

However, in addition to these advantages, antimony also entails a number of serious disadvantages. For example, positive electrode grids which are made of a lead antimony alloy corrode much more strongly than do electrode grids of pure lead or of other antimony free alloys, as, for example, lead calcium alloys. This corrosion takes place along the metallurgical grain boundaries. Because of the volume increase during oxidation it leads to a growth of the grids which is undesirable for many reasons. As corrosion products in positive grids during utilization of the storage battery there are produced three and five valent antimony containing anions (antimony sulfate=$SbOSO_4^-$ [$H_{5n-\nu}Sb_nO_{5n}]^{\nu -}$) which migrate to the negative electrode and are there reduced to antimony. However, antimony at the negative electrode reduces the hydrogen excess potential and thereby promotes self-discharge of the storage battery. This migration of antimony to the negative electrode is therefore responsible for a significant fraction of the maintenance effort which lead storage batteries require.

The costs and inconveniences associated with the maintenance of lead storage batteries have led to the use, in many areas of application, of antimony poor or antimony free grids. Such storage batteries can always be used successfully when the storage battery is generally used as buffer storage and only discharged partially and intermittently. This area of application includes particularly the starter battery and the stationary lead battery which is used for reliable supply of telephone networks.

However, in practice, a significant fraction of lead storage batteries is used in a heavily cyclic manner, for example, in the energy supply for forklift trucks or electrically driven vehicles. In those storage batteries which are subject to such cyclical utilization and occasional deep discharges, antimony poor or antimony free grids have heretofore not always been successful because, upon cyclical loading with lack of antimony, undesired changes take place in the mass so that it loses its capacity and has a tendency to crumble. This disadvantage exists in positive grid plates as well as in positive tubular electrodes.

It is therefore already known, for example from U.K. Pat. No. 1,329,974, to add to the positive active mass of a positive electrode which contains an antimony free or antimony poor grid, antimony oxide in the form of an admixture to the active mass. On the one hand, antimony oxides are soluble in the electrolyte; on the other hand, the antimony then diffuses very easily to the negative electrode. As a result after only a few cycles it loses its desirable effect upon the positive electrode. It is also known to subsequently apply a layer of antimony-containing lead alloy to an electrode grid which is made of an antimony free alloy. However, this method requires a very costly additional effort, which is not in appropriate relationship to the slight improvement which it produces.

Furthermore, it is known from U.S. Pat. No. 3,723,182 to make the lead powder which is used for the manufacture of the active mass from an alloy of lead and antimony in which this alloy has a very low antimony content. From this alloy there are then produced lead oxides by conventional methods and these lead oxides then consist substantially of antimony oxide. In this method there is produced a paste which contains antimony in extremely fine subdivision. The antimony additive is present essentially as antimony oxide because small fractions of metallic antimony which may still be present in the lead oxide powder which is produced also oxidize during ripening of the electrodes. This very finely divided antimony oxide then diffuses as previously explained, very rapidly to the negative electrode and the desirable effect in the positive electrode is lost.

Accordingly it is an object of the present invention to provide a positive electrode for lead storage batteries which has an electrode frame of an antimony free or antimony poor alloy and which includes within the antimony in an easily introduceable form, whereby the mass antimony does not reach the negative electrode within only a few cycles causing it to lose its effect upon the positive electrode. By antimony poor alloys there are to be understood in particular those alloys which contain less than 3% antimony and preferably less than 1.5% antimony.

This and other objects which will appear are achieved in accordance with the invention by an active mass which contains antimony emitting storage bodies, which provide an antimony yield continuously throughout the life of the storage battery.

This continuous antimony output achieves the desired objective via two different routes in accordance with the invention. The first route is predicated on the fact that the diffusion characteristic of a storage body provided within the active mass can be controlled by its dimensioning, a particular relationship of volume to surface being determinative for this dimensioning. The second route provides for preconditioning of the antimony, by packaging it in a container having the form of a synthetic plastic matrix and only limited retention capability, and from which it is therefore progressively released.

There will first be further described the first of these routes to a solution. In this, the relationship of the volume of the storage body to its surface is so proportioned that the antimony yield takes place spread out continuously over the life span of the storage battery. The body dimension which determines the diffusion characteristic is the radius for a sphere, the half thickness for a flat rectangular body, and the half diameter for an elongated rod-like structure.

In accordance with the invention this diffusion determining dimension of the storage battery is so selected as to correspond to the normal thickness of the corrosion layer of the grid which corresponds to the life span of the electrode. The minimum linear dimension should be at least about 100 microns.

By these means, the effect of corrosion upon the positive grid is greatly reduced, on the one hand, while on the other, the antimony or an antimony alloy can be added to the active mass in such form relative to its quantity, composition and size of individual particles, that contamination of the mass with antimony is maintained over the entire life span of the storage battery by means of a predetermined storage characteristic. Through distribution of the granulate within the positive mass the diffusion paths of the antimony containing anions to the $PbO_2$ particles remain uniform and there is therefore achieved optimum utilization of the antimony liberated from the granulate. The increased corrosion resistance of the grid enables it to be constructed more weakly, thereby saving lead. It is true that a fraction of the metal which is thus saved is again introduced into the mass in the form of the metallic antimony or antimony containing alloy. However, the anitmony content of this alloy may be selected at will. When a lead antimony alloy is involved, the antimony content may be between 10 and 80%, or rather between 40 and 60%. Antimony fractions of 5 to 30% by weight, and preferably of about 10 to 20% by weight, or rather for example a conventional 12% eutectic alloy of lead and antimony may be used. The higher the antimony content of the alloy added to the paste, the lower may be the total surface of the granular alloy used for antimony storage and from which the antimony is emitted. This creates the possibility of so proportioning the particle size distribution of the storage alloy that a nearly constant storage effect takes place even over a very long cyclical life span. In many instances it is also desirable for practical reasons to so proportion the quantity of the antimony storage alloy that it equals in its antimony output the effect of the antimony containing grid.

If $O_1$ denotes the surface of the grid, $P_1$ the antimony content of the grid alloy, $P_0$ the antimony content of the storage alloy, $\rho_0$ the specific weight of the storage alloy, and $d_0$ the diameter of the spherical storage alloy, then the weight $G_0$ of the storage alloy quantity to be added to the mass per electrode, with the same number of antimony atoms on the surface as the antimony containing grid which is to be replaced, is given by $$G_0 = (\rho_0 d_0 P_1 O_1)/^6 P_0$$

Because of the more favorable distribution of the antimony store within the mass which is to be contaminated, as compared with the case of antimony containing grids, the quantity of the added storage alloy can generally be less than the value calculated by this formula.

EXAMPLE

A typical application example for practical use can be derived from the starter battery art. Normally starter batteries of automobiles are not cyclically loaded, so that the maintenance freedom and the low corrosion characteristic of antimony free or antimony poor grids makes itself fully felt. For the sake of rational manufacture it is however desirable to utilize such batteries also for cyclical applications, for example in motorized bicycles (Mopeds), lawn mowers, or for powering electric boats. In those instances the lack of antimony makes itself exceptionally undesirably felt in the electrochemical behavior of the positive electrode; it leads to the known failures through reduction in capacity and crumbling.

In accordance with the invention this type of starter battery can be made resistant to cycling for the applications described, while maintaining all of the manufacturing parameters, simply by adding the storage alloy to its positive mass.

A positive grid in a starter battery has a surface of about 250 cm², which contains about 75 g of dry unformed mass. Five percent antimony content in the grid alloy is a value which is frequently used in practice. If it is desired to achieve a similar intromission effect by means of the storage alloy, then, in accordance with the computation formula, there must be added to the mass an antimony alloy containing 50% antimony in the amount of about 3.5 g from the storage alloy. If about 1 mm thick shot pellets are used, it turns out that antimony release due to progressive corrosion of these shot pellets is assured during the entire life span of the battery.

In place of lead antimony alloys, there can of course also be used antimony alloys with other metals. For example, these may be alloys of antimony with tin or other alloy components used in storage battery technology. The antimony content of the added alloy should generally exceed 10%, for example it should be between 10 and 80% and particularly between 40 and 50%.

The emission effect per cm² of the effective surface of such an alloy can readily be determined by a simple corrosion test in sulfuric acid of a concentration prevailing in the storage battery, using the potential of the $PbO_2$ electrode. The emission effect equivalent to an antimony containing lead grid can then be very readily determined. The particle size of the granulate which is made from the antimony containing alloy is obtained by utilizing the corrosion layer created during the life of the storage battery as the measure for the smallest linear dimension of the granular or pelletized particles to be added to the active mass. For example, in a storage battery with positive electrodes of a 9% antimony lead alloy there arises after 1200 cycles a corrosion layer of approximately 0.5 to 1 mm. In that case, when using an antimony free alloy, a granulate of 0.5 to 1 mm particle size should be used. This particle size should generally be greater than about 100 microns, preferably greater than about 150 microns, and especially in the region of about 400 microns to 800 microns.

The second solution of the stated objective in accordance with the invention consists of a synthetic plastic sphere or synthetic plastic cylinder, generally designated as a matrix, which is distributed as a granulate throughout the active mass. In each sphere of this granulate there are embedded within the synthetic plastic mass many individual particles of antimony, an antimony compound or an antimony alloy.

As antimony compounds there are preferably used its oxides or antimonate of lead. As antimony alloys there are suitable, in addition to those previously mentioned, also those of antimony with silver, or arsenic, or tellurium, and if desired also such alloys in which lead is present as ternary component.

By either grinding or pelletizing the materials used, the antimony containing particles are given irregular shapes in the former case and predominantly spherical shapes in the latter. The particle size is determined by the predetermined sieve fraction.

Depending upon the intended application as the antimony storage in a positive electrode of a lead storage battery, the synthetic plastic sphere might have the following dimensions.

Diameter of the sphere: 1 mm (Depending upon the electrode thickness it may be up to 3 mm but should in no event be as thick as the electrode itself).

Particle size of the antimony containing particles: 100 microns.

Quantity of antimony containing particles per sphere: 370 units.

Minimum average distance between antimony containing particles inside the sphere, equivalent to the smallest average wall thickness of the synthetic plastic layer between two adjacent antimony containing particles: 30 microns.

This average distance between two adjacent antimony containing particles is subject to substantial variations and may in practice lie between 10 and 60 microns.

The liberated antimony is oxidized under the influence of the applied potential and the contacting sulfuric acid into $Sb^{5+}$ ions, reaches the mass of the positive electrode and exerts a beneficial influence upon its transformation.

The duration of the storage effect of the antimony containing synthetic plastic spheres in regard to the liberation of antimony containing substance may be varied by means of the properties of the synthetic plastic used. It is determined by the response of the synthetic plastic to oxidative decomposition.

Of significance for the storage effect is a time span of from one month to twenty years.

In other respects, that which has previously been stated with respect to the initially discussed storage body is also true for the synthetic plastic matrix, as regards its favorable effect upon the corrosion of the positive grid, and its contamination of the active mass controllable through particle size and antimony content. In this matrix the antimony content may, when metallic antimony is involved, even reach 99% by weight. Preferably it is between 60 and 90% by weight.

The functioning of the matrix can be explained as follows:

In the active mass of the positive electrodes of a storage battery the above described matrix is permanently subjected to an oxidizing influence within a sulfuric acid containing medium. This medium causes oxidative decomposition of the surrounding synthetic plastic. After a predetermined period of influence of the decomposing forces the decomposition of the surrounding synthetic plastic will have progressed in certain places to the point that one or more particles of the incorporated antimony bearing material are exposed to the sulfuric acid, oxidized and dissolved. It then reaches the active mass of the positive lead electrode and there exerts a beneficial effect upon the electrochemical utilization capability of the active mass.

The decomposition of the synthetic plastic material continues and, due to the many incorporated antimony bearing particles and the variations in thickness of the synthetic plastic walls which have to be removed to liberate the consecutive particles, a small quantity of antimony bearing substance will be liberated progressively over a period of several years at statistically distributed intervals.

The rate and duration of the liberation of antimony bearing substance may be controlled as follows:

In the first place, the quantity of antimony to be released per unit time is determined by the number of synthetic plastic spheres within the active mass. The time span during which the synthetic plastic spheres exert their storage effect is determined by the size of the spheres as well as by the resistance to decomposition of the synthetic plastic material.

The resistance of the synthetic plastic material should be made commensurate with the strength of the decomposing forces. This is done by appropriate selection of the synthetic plastic material, its modified composition (pure polymer, co- or branched polymer), its additives (emollient, stabilizer), and its treatment during incorporation of the antimony bearing material (sintering, extrusion).

As synthetic plastic for the matrix there may be used: polyvinyl chloride, polysulfone, epoxy resins, polyethylene enterophthalate, polybutyl enterophthalate, polyethylene, polypropylene, polytetrafluoroethylene, polytrifluorochloroethylene. This list does not, however, purport to be exhaustive.

The time span until complete consumption of the synthetic plastic spheres, or until exhaustion of the antimony storage is to be regarded as being determinable to an order of magnitude by means of analytically determined weight losses through oxidative decomposition.

The factor which determines the corrosion rate of given synthetic plastics is their degree of polymerization. For example, a low polymer PVC decomposes more rapidly than a high polymer product with correspondingly higher molecular weight. Under these conditions, the decomposition period of a synthetic plastic material may extend from a few months to many years.

The method for producing the synthetic plastic spheres is outlined in the following four examples,

EXAMPLE 1

This uses a PVC powder with the following properties known in themselves:

It consists of a PVC branched polymer or copolymer, or pure PVC and contains, if desired, a fraction of emulsifiers and emollients. The composition of the synthetic plastic and its structure are so coordinated as a result of experience in the synthetic plastic art that, under anodic loading in dilute sulfuric acid solution, it decomposes at a rate of about 15 microns per year and so that only a small quantity of chlorine is liberated in the active mass or in the electrolyte during this decomposition.

Such data about the long term behavior of the synthetic plastic may be derived rapidly through corrosion tests performed in accordance with an accelerated process, that is under intensified test conditions, with reasonable reliability.

Such a material with a particle size of 100 microns is mixed with antimony or antimony oxide powder of particle size equal to 100 microns in the weight ratio Sb : PVC = 2.908, or $Sb_2O_3$ : PVC = 2.284. The mixture is homogenized and plasticized through and through in known manner by means of processing machinery such as mixers, kneading machines and rollers. It is drawn out into continuous, circular-cross section rods of 0.1 cm thickness by means of a worm gear press or extruder, and it is sliced or chopped into 0.1 cm pieces by rotating knives. Thereafter, the segments produced in this manner are subjected to surface melting during free-fall through a heated drop tube, in order to eliminate cracks, and then again allowed to cool in a cooling tube connected thereto. In this manner, there is obtained a granulate of the desired particle size of 1 mm ranging in shape from cylindrical to spherical.

The granulate produced in accordance with the invention as described in Example 1 is mixed with a lead powder paste in accordance with the invention and is pasted upon a grid consisting of antimony free lead or an antimony free lead alloy. In this way it is introduced into a positive electrode of a lead storage battery which has been pasted in conventional manner. After final assembly of the storage battery and filling with sulfuric acid, the decomposition of the synthetic plastic begins and over a time span of 10 years opens one cavity at a time in statistically distributed time intervals of about 10 days. From this the antimony or $Sb_2O_3$ is then liberated and oxidized to $Sb^{5+}$ ions by the applied potential and the contacting sulfuric acid. These ions then reach the mass of the positive electrode and operate beneficially thereon.

EXAMPLE 2

A fine grained PVC powder, which may consist of pure PVC or of a co- or branched polymer with slightly enhanced decomposability in a sulfuric acid oxidizing medium, is mixed with antimony powder or antimony oxide powder as Sb : PVC = 2.908 or $Sb_2O_3$ : PVC = 2.284. The mixture is raised to temperatures of 150° to 170° C. in a special mixer conventionally employed in the PVC sinter art. This produces through agglomeration a coarsely grained and runny material which consists of PVC with embedded particles of antimony or antimony oxide. This material can be further agglomerated by sintering or other techniques and if desired also reduced in size and passed through a sieve. In so doing, the further processing is performed in such a way that it preferably achieves a particle size of 1 mm.

EXAMPLE 3

A suitable polypropylene powder should have the following properties:

It should consist of pure polypropylene or a copolymer and should contain a proportion of emulsifiers and emollients. The composition of the polypropylene and its structure are intentionally so matched to each other that the material is decomposed at a rate of 15 microns a year under anodic loading in dilute sulfuric acid solution.

Such material having a particle size of 100 microns is mixed with antimony or antimony trioxide powder or particle size equal to 100 microns in the weight relationship Sb : PP = 4.314 $Sb_2O_3$ : PP = 3.308.

The mixture is homogenized and plasticized throughout in known manner by processing machinery such as mixers, kneading machines and rollers, it is then drawn into continuous circular, cross-section rods of 0.1 cm thickness by means of a worm gear press or extruder. It is then sliced or chopped by rotating knives into discs of 0.1 cm thickness, either while hot at the injection nozzle, or while cold after the quenching.

EXAMPLE 4

In accordance with the conventional procedure for a hardenable epoxy resin, there are stirred together 1.4 g of epoxy resin and 0.2 g of hardener. Before the mass hardens there are stirred in 2.62 g of antimony powder of particle size corresponding to the sieve fraction of 0.01 to 0.006 cm.

Within the time span provided for the processing of epoxy resin the mixture is extruded into a rod of 0.1 mm diameter and is then permitted to harden.

Thereafter the rod is chopped or sliced into small segments of 0.1 cm thickness.

EXAMPLE 5

In some cases, e.g. when using very thin electrodes, it is advantageous to use antimony emissive storage bodies having a very small particle size in an accordingly greater number. It is then also necessary to use antimony particles of a much smaller size which are embedded in the synthetic plastic matrix. If for example the storage bodies have a particle size of about 50 $\mu$, the antimony particles embedded therein should have a particle size of not more than about 5 $\mu$.

We claim:

1. A positive electrode for lead storage batteries having an electrode support frame of antimony free or antimony poor lead alloy which contains antimony in the electrochemically active mass, characterized in that the active mass contains distributed storage bodies of substantial antimony content, said bodies being so constructed as to release antimony into the surrounding mass progressively throughout the life span of the storage battery.

2. The positive electrode of claim 1 wherein the storage bodies constitute a granulate whose particle size is greater than 100 microns, and the antimony in the bodies is metallic antimony, or antimony alloyed with other metal.

3. The positive electrode of claim 2 wherein the particle size of the granulate is between about 300 microns and 1 mm and preferably between about 400 microns and 800 microns.

4. The positive electrode of claim 1 wherein the distributed storage bodies are formed of a synthetic plastic matrix in which there are embedded particles of metallic antimony, or of antimony in compound or antimony alloyed with other metal, the matrix being distributed in the active mass as a granulate.

5. The positive electrode of claim 4 wherein the antimony containing particles embedded in the synthetic plastic matrix have a particle size between about 50 and 150 microns and preferably between about 80 and 120 microns.

6. The positive electrode of claim 4 wherein the matrix has particle size of about 0.8 to 3 mm and preferably about 1 to 2 mm.

7. The positive electrode of claim 4 wherein the smallest average distance between a particle embedded in the synthetic plastic matrix and its neighbor is between about 10 and 60 microns and preferably between about 20 and 40 microns.

8. The positive electrode of claim 3 wherein the storage bodies have a diffusion characteristic so proportioned that the antimony release takes place throughout the battery life.

9. The positive electrode of claim 8 wherein the bodies have a dimension which determines the diffusion characteristic, and that dimension corresponds to the thickness of the grid corrosion layer formed during the battery life.

10. The positive electrode of claim 9 wherein the storage bodies are substantially spherical, flat rectangular, or rod-like, the diffusion determining dimension being the radius for the spherical bodies, the half thickness for the flat rectangular bodies, and the half diameter for the rod-like bodies.

11. The positive electrode of claim 10 wherein the storage bodies are spherical and the maximum weight $G_0$ of antimony alloy to be added to the mass of an electrode in the form of said spherical storage bodies is given by the formula $$G_0 = (\rho_0 d_0 P_1 O_1)/6 P_0$$

where $O_1$ denotes the surface of the grid, $P_1$ the antimony content of the grid alloy, $P_0$ the antimony content of the storage alloy, $\rho_0$ the specific weight of the storage alloy, and $d_0$ the diameter of the spherical storage alloy.

12. The positive electrode of claim 4, wherein the matrix is a sphere of 1mm diameter, the embedded antimony particles have a 100 micron particle size, and there are 370 particles per sphere.

13. The positive electrode of claim 4 wherein the matrix has a particle size of about 50 microns and the antimony embedded therein has a particle size of no more than about 5 microns.

* * * * *